United States Patent
Oberpriller et al.

(10) Patent No.: US 9,135,488 B2
(45) Date of Patent: *Sep. 15, 2015

(54) CUSTOMER FACING IMAGING SYSTEMS AND METHODS FOR OBTAINING IMAGES

(71) Applicant: Hand Held Products, Inc. D/B/A Honeywell Scanning and Mobility, Fort Mill, SC (US)

(72) Inventors: Mark L. Oberpriller, Atlanta, GA (US); Timothy R. Fitch, Syracuse, NY (US); Donna M. Fletcher, Auburn, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/327,722

(22) Filed: Jul. 10, 2014

(65) Prior Publication Data
US 2014/0319221 A1 Oct. 30, 2014

Related U.S. Application Data

(63) Continuation of application No. 13/739,576, filed on Jan. 11, 2013, now Pat. No. 8,777,109.

(60) Provisional application No. 61/709,537, filed on Oct. 4, 2012.

(51) Int. Cl.
G06K 7/10 (2006.01)
H04N 5/225 (2006.01)
H04N 5/232 (2006.01)

(52) U.S. Cl.
CPC .......... *G06K 7/1095* (2013.01); *G06K 7/10722* (2013.01); *H04N 5/2252* (2013.01); *H04N 5/23212* (2013.01)

(58) Field of Classification Search
USPC ............. 235/462.43, 462.14, 375, 454, 462.3
See application file for complete search history.

(56) References Cited

U.S. PATENT DOCUMENTS

| | | | |
|---|---|---|---|
| 3,564,132 A | 2/1971 | Baker et al. |
| 3,774,014 A | 11/1973 | Berler |
| 3,997,723 A | 12/1976 | Sandin |
| 4,821,118 A | 4/1989 | Lafreniere |
| 4,929,819 A | 5/1990 | Collins, Jr. |
| 5,019,699 A | 5/1991 | Koenck |
| 5,072,246 A | 12/1991 | Thayer et al. |

(Continued)

OTHER PUBLICATIONS

LSR110 Mobile Phone Bar Code Imager, available from Access IS, Reading, Berkshire, United Kingdom, 2-pages, Apr. 2009.

(Continued)

*Primary Examiner* — Edwyn Labaze
(74) *Attorney, Agent, or Firm* — Additon, Higgins & Pendleton, P.A.

(57) ABSTRACT

An imaging system for obtaining an image of a display of an electronic device presented by a presenter holding the electronic device includes a housing having an imaging subsystem disposed in the housing. The imaging subsystem includes an image sensor array and an imaging assembly operative for focusing an image of the display on the electronic device onto the image sensor array. A support includes a support surface and is operable for allowing the presenter to hold the electronic device against the support surface so that the display on the electronic device is positioned towards the imaging system while the image of the display is obtained.

20 Claims, 16 Drawing Sheets

(56) References Cited

U.S. PATENT DOCUMENTS

| | | |
|---|---|---|
| 5,642,160 A | 6/1997 | Bennett |
| 5,747,784 A | 5/1998 | Walter et al. |
| 5,793,033 A | 8/1998 | Feng et al. |
| 5,841,121 A | 11/1998 | Koenck |
| 5,949,052 A | 9/1999 | Longacre, Jr. et al. |
| 5,960,100 A | 9/1999 | Hargrove |
| 6,060,722 A | 5/2000 | Havens et al. |
| 6,179,206 B1 | 1/2001 | Matsumori |
| 6,236,736 B1 | 5/2001 | Crabtree et al. |
| 6,330,973 B1 | 12/2001 | Bridgelall et al. |
| 6,332,575 B1 | 12/2001 | Schuessler et al. |
| 6,336,587 B1 | 1/2002 | He et al. |
| 6,681,994 B1 | 1/2004 | Koenck |
| 6,729,546 B2 | 5/2004 | Roustaei |
| 7,137,555 B2 | 11/2006 | Bremer et al. |
| 7,246,747 B2 | 7/2007 | Bremer et al. |
| 7,252,234 B2 | 8/2007 | Wilde et al. |
| 7,322,526 B1 | 1/2008 | Koenck |
| 7,382,911 B1 | 6/2008 | Meier et al. |
| 7,395,970 B2 | 7/2008 | Poloniewicz et al. |
| 7,527,203 B2 | 5/2009 | Bremer et al. |
| 7,591,415 B2 | 9/2009 | Jesme |
| 7,748,620 B2 | 7/2010 | Gomez et al. |
| 7,878,405 B2 | 2/2011 | Kricorissian |
| 7,900,840 B2 | 3/2011 | Herwig |
| 8,028,916 B2 | 10/2011 | Herwig et al. |
| 8,365,992 B2 * | 2/2013 | Gregerson et al. ............ 235/383 |
| D702,237 S | 4/2014 | Oberpriller |
| 8,777,109 B2 | 7/2014 | Oberpriller |
| 2012/0145793 A1 * | 6/2012 | Kearney .................. 235/472.02 |
| 2012/0187187 A1 | 7/2012 | Duff et al. |
| 2013/0256395 A1 | 10/2013 | Barkan et al. |

OTHER PUBLICATIONS

LSR120 2D Bar Code Imager, available from Access IS, Reading, Berkshire, United Kingdom, printed from the Internet Oct. 4, 2012, http://web.archive.org/web/20100909173112/http://www.access-is.com/lsr120-2d-bcbp-bar-code-imager-php, 1-page, 2010.

Sumlung 2D Barcode Reader SL-QC15S (QR Code) available from Shanghai Sumlung(xialang) Information Technology Co.,Ltd., Shanghai, China printed from the Internet Oct. 4, 2012, http://web.archive.org/web/20100402054426/http://www.sumlung.com/en/index.php?option=com_content&view=article&id=95, 1-page, 2010.

Jadak PR-215 Kiosk Scanner, available from Jadak Technologies, Breda, The Netherlands, and North Syracuse, New York, 2-pages, Mar. 2012.

Jadak PR-1 Phone Reader, available from Jadak Technologies, Breda, The Netherlands, and North Syracuse, New York, 2-pages, Jun. 20, 2012.

Jadak PR-3 Phone Reader, available from Jadak Technologies, Breda, The Netherlands, and North Syracuse, New York, 2-pages, Apr. 9, 2012.

Jadak KM-204 Phone Reader, available from Jadak Technologies, Breda, The Netherlands, and North Syracuse, New York, 2-pages, Jun. 6, 2012.

Oberpriller et al., pending Design U.S. Appl. No. 29/486,759, filed Apr. 2, 2014, "Imaging Terminal". Related to Current Application, 8 pages.

* cited by examiner

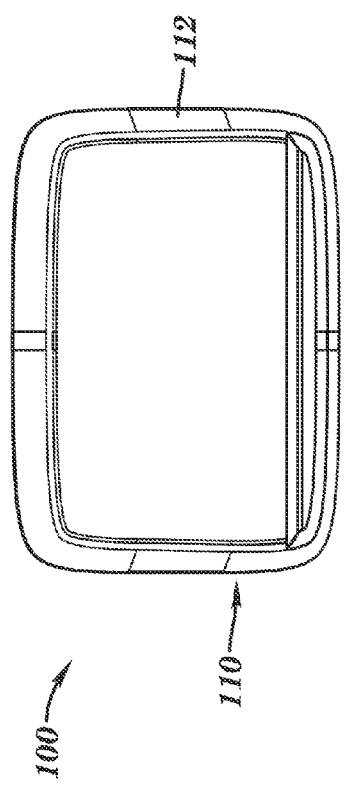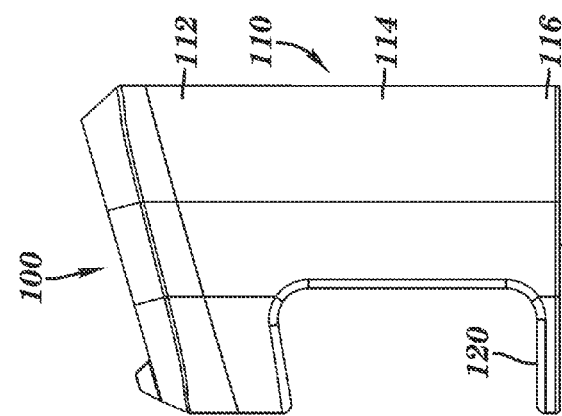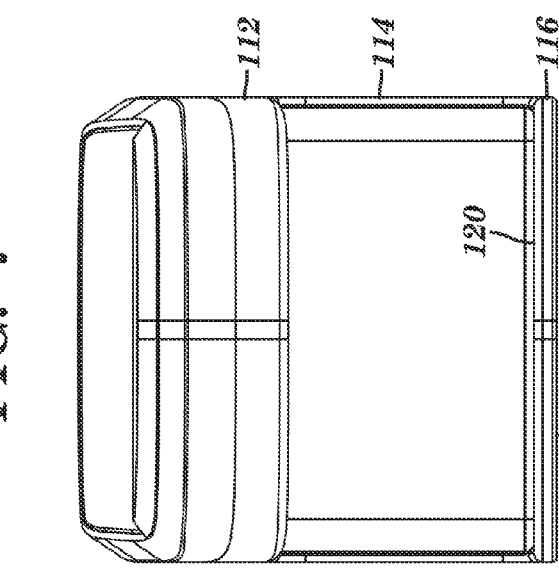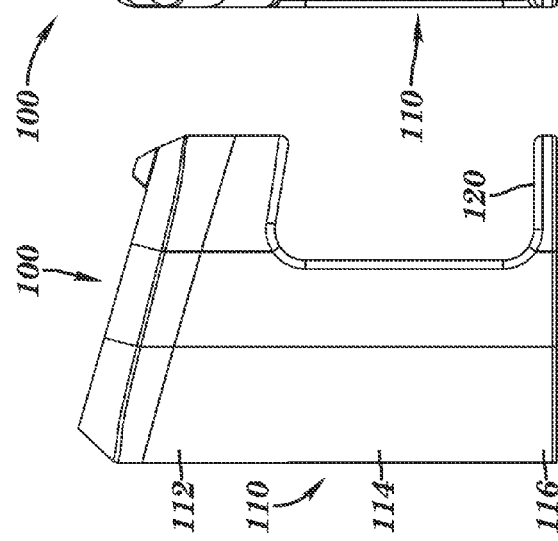

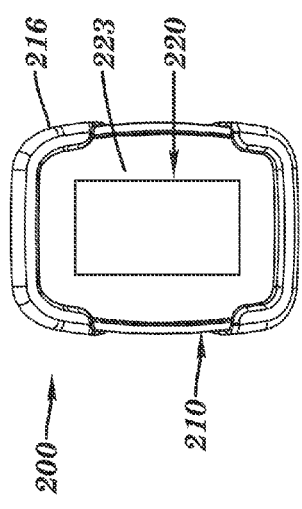
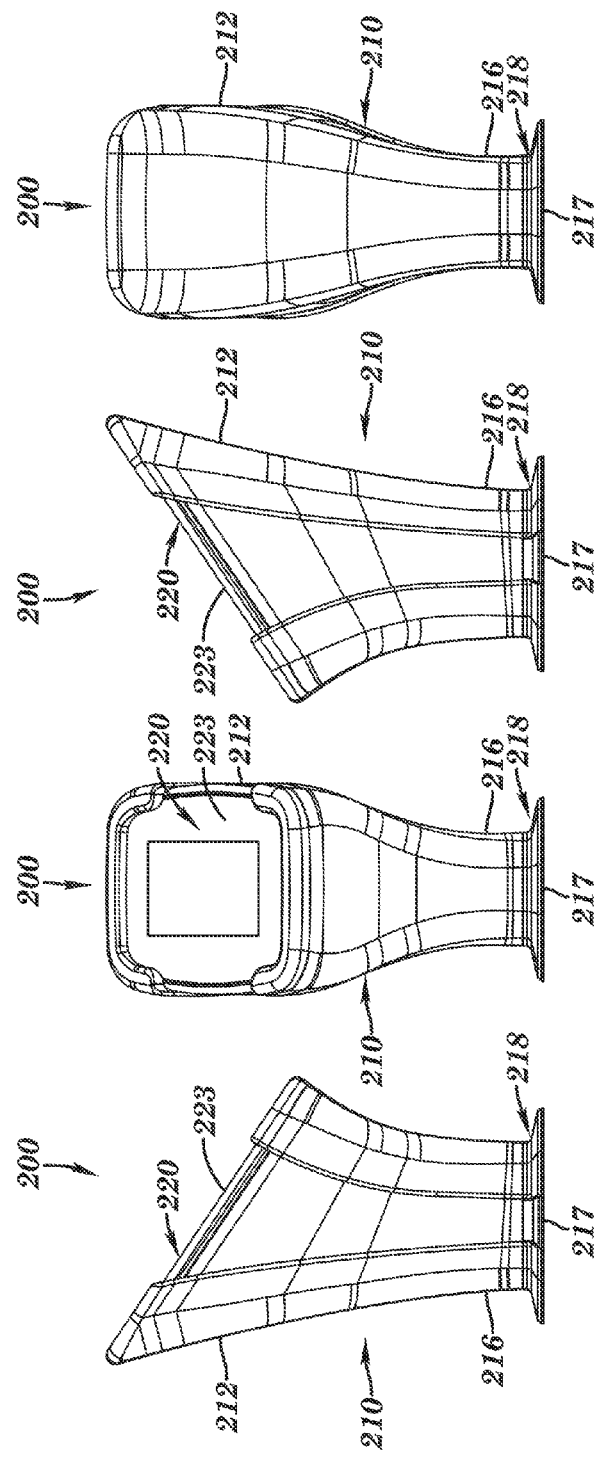

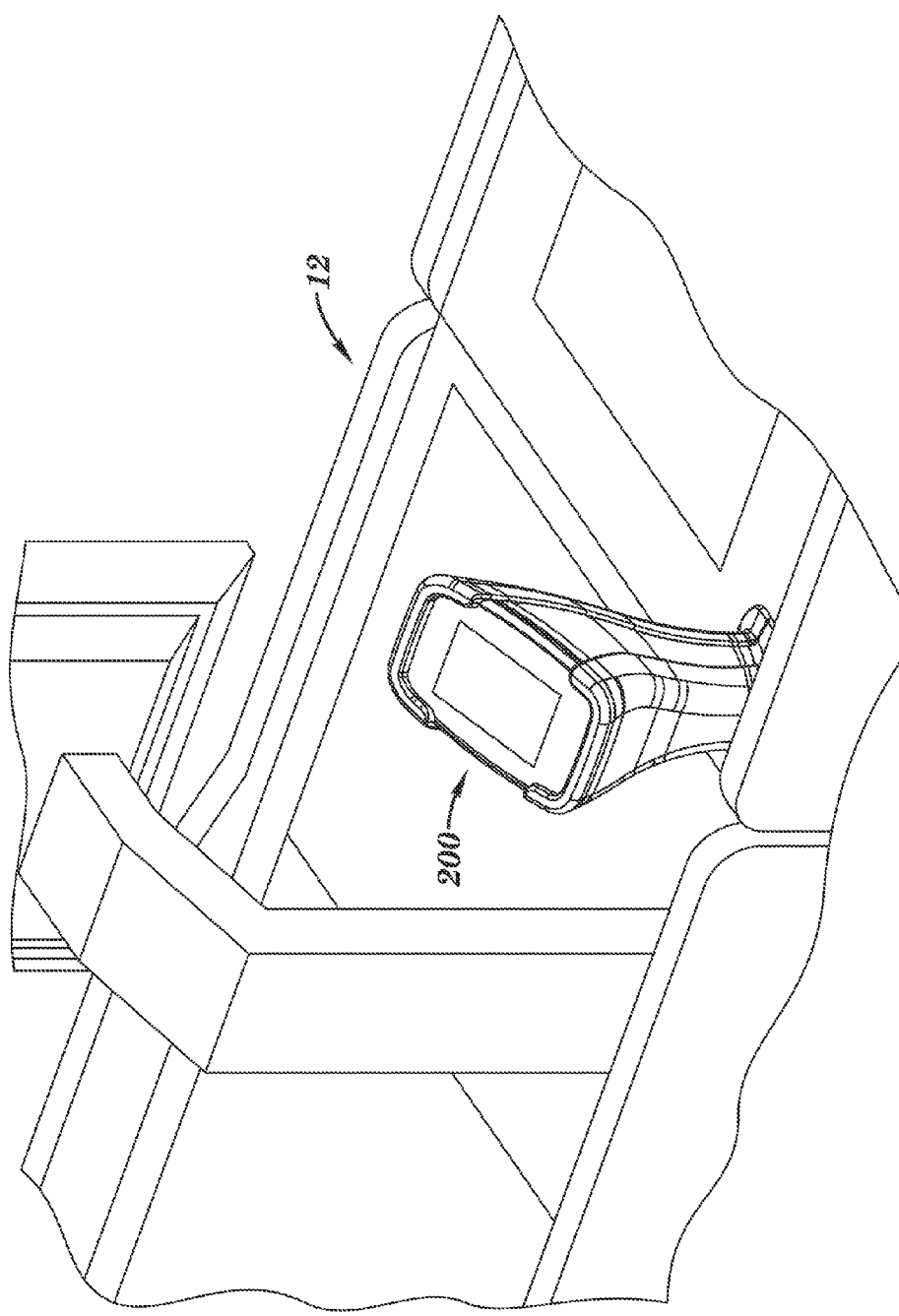

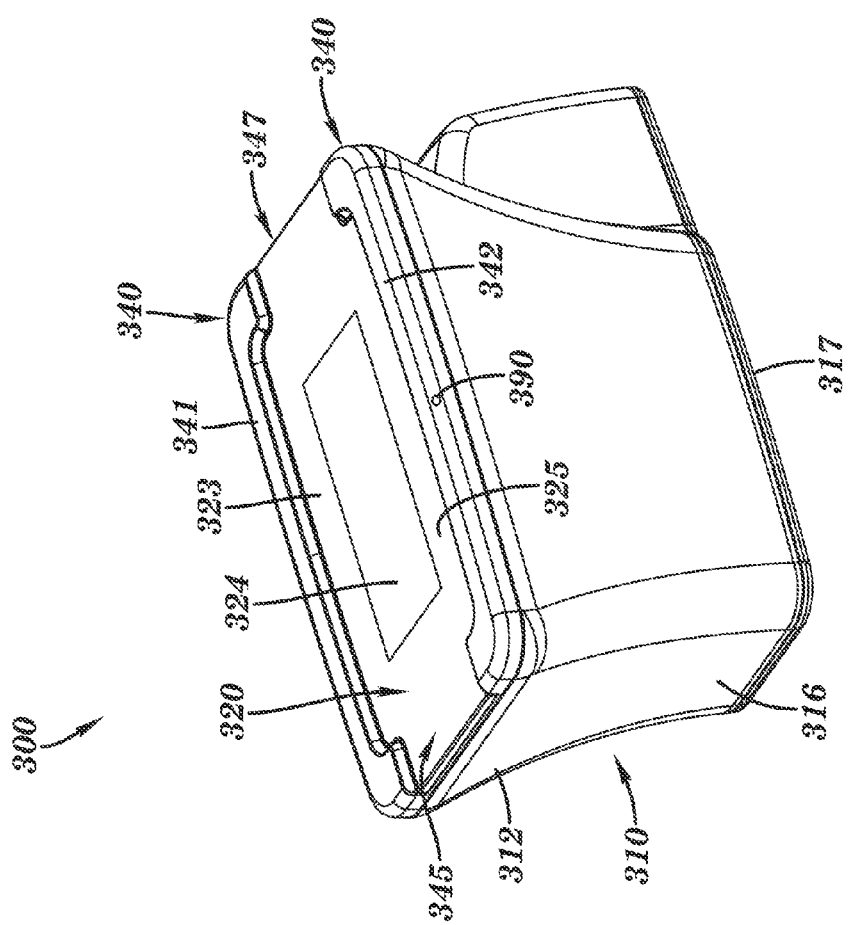

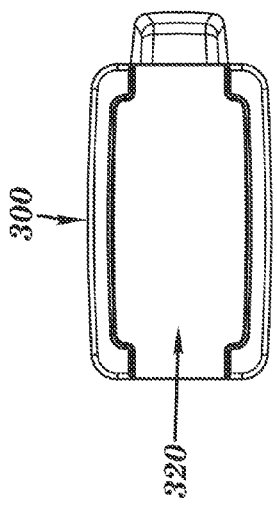
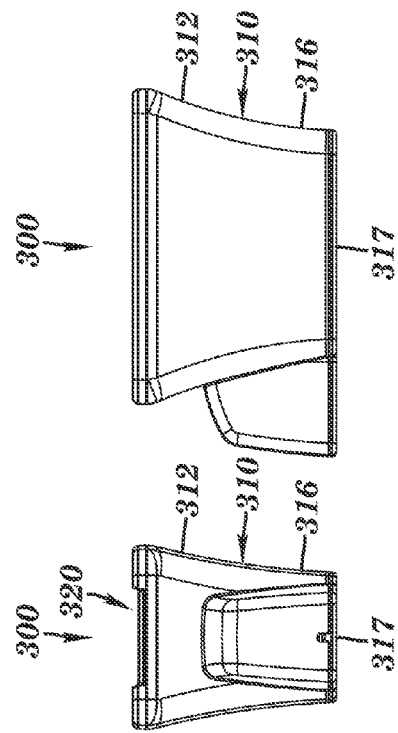
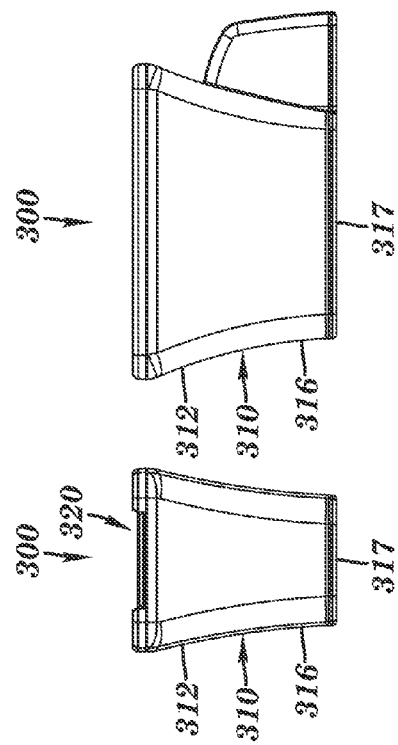

800

PROVIDING A SUPPORT COMPRISING A SUPPORT SURFACE OPERABLE FOR ALLOWING A PRESENTER TO HOLD AN ELECTRONIC DEVICE AGAINST THE SUPPORT SURFACE SO THAT A DISPLAY ON THE ELECTRONIC DEVICE IS POSITIONED TOWARDS AN IMAGER

810

OBTAINING, WHEN THE ELECTRONIC DEVICE IS POSITIONED ON THE SUPPORT, AN IMAGE OF THE DISPLAY OF THE ELECTRONIC DEVICE WITH THE IMAGER

CUSTOMER FACING IMAGING SYSTEMS AND METHODS FOR OBTAINING IMAGES

CROSS-REFERENCE TO RELATED APPLICATIONS

The present application claims the benefit of U.S. patent application Ser. No. 13/739,576 for Customer Facing Imaging Systems and Methods for Obtaining Images filed Jan. 11, 2013 (and published Apr. 10, 2014 as U.S. Patent Application Publication No. 2014/0098284), now U.S. Pat. No. 8,777,109, which claims the benefit of U.S. Provisional Application No. 61/709,537 for Customer Facing Imaging Systems and Methods for Obtaining Images filed Oct. 4, 2012. Each of the foregoing patent applications, patent publication, and patent is hereby incorporated by reference in its entirety.

U.S. patent application Ser. No. 29/446,944 for an Imaging Terminal filed Feb. 28, 2013, now U.S. Pat. No. D702,237 also claims the benefit of U.S. patent application Ser. No. 13/739,576. U.S. patent application Ser. No. 29/486,759 for an Imaging Terminal filed Apr. 2, 2014 also claims the benefit of U.S. patent application Ser. No. 29/446,944. Each of the foregoing patent applications and patent is hereby incorporated by reference in its entirety.

FIELD OF THE INVENTION

This disclosure relates generally to imaging systems, and more specifically, to customer facing imaging systems operable for obtaining images from displays on portable electronic devices.

BACKGROUND

Generally, bar code readers are electronic devices for reading bar codes. Typically, a bar code reader includes a light source, a lens, a light sensor, and decoder circuitry for analyzing the bar code's image data.

For example, when a shopper purchases a product at a store, a bar code reader is often used by a cashier at a point-of-sale to read a bar code carried by the product. Recently, paperless bar coded manufacturers "coupons" are now commonly sent to shoppers' cell phones.

There is a need for further imaging systems, and more specifically customer facing imaging systems operable for obtaining images from displays on portable electronic devices.

SUMMARY

One aspect of the present disclosure is directed to a method for obtaining images. The method includes providing a support comprising a support surface operable for allowing a presenter to hold an electronic device against the support surface so that a display on the electronic device is positioned towards an imaging system, and obtaining, while the electronic device is positioned against the support and held by the presenter, an image of the display of the electronic device with the imager.

Another aspect of the present disclosure is directed to an imaging system for obtaining an image of a display of an electronic device presented by a presenter holding the electronic device. The imaging system includes a housing having an imaging subsystem disposed in the housing. The imaging subsystem comprising an image sensor array and an imaging assembly operative for focusing an image of the display on the electronic device onto the image sensor array. A support comprising a support surface is operable for allowing the presenter to hold the electronic device against the support surface so that the display on the electronic device is positioned towards the imaging system while the image of the display is obtained.

BRIEF DESCRIPTION OF THE DRAWINGS

The subject matter which is regarded as the invention is particularly pointed out and distinctly claimed in the concluding portion of the specification. The disclosure, however, may best be understood by reference to the following detailed description of various embodiments and the accompanying drawings in which:

FIGS. 4-8 are a front elevational view, a left side elevational view, a right side elevational view, a top view, and a rear elevational view of the imaging system of FIG. 1;

FIGS. 12-16 are a front elevational view, a right side elevational view, a left side elevational view, a top view, and a rear elevational view of the imaging system of FIG. 11;

FIG. 18 is a perspective view of the imaging system of FIG. 11 disposed on a checkout counter;

FIG. 19 is a perspective view of another embodiment of an imaging system in accordance with aspects of the present disclosure;

FIGS. 20-24 are a front elevational view, a right side elevational view, a left side elevational view, a top view, and a rear elevational view of the imaging system of FIG. 19;

FIG. 32 is a flowchart of a method for use in obtaining images in accordance with aspects of the present disclosure.

DETAILED DESCRIPTION

The present disclosure is generally directed to obtaining an image displayed on a display of a portable electronic device presented by a presenter such as a customer while the presenter maintains a hold onto the electronic device. For example, an image of the display may be obtained during transactions such as point-of-sale transactions, event ticketing, rail and air transport ticketing, airline and airport boarding passes, and other transactions, and installed in a customer facing orientation allowing the presenter or customer to readily present the display of the electronic device for imaging during the transaction. The display of the electronic device may include an indicia such as a bar code operable as a coupon, ticket, authorization for payment, etc. in connection with the transaction. The imaging system may be operable for imaging portable electronic devices such cell phones, mobile phones, smart phones, satellite phones, telemetric devices, personal data assistants (PDA), and other portable electronic and hand held devices. In addition, images of other objects such as paper coupons, driver's licenses, identification cards, store or loyalty cards, etc. may be imaged with the imaging system.

Figure 1:
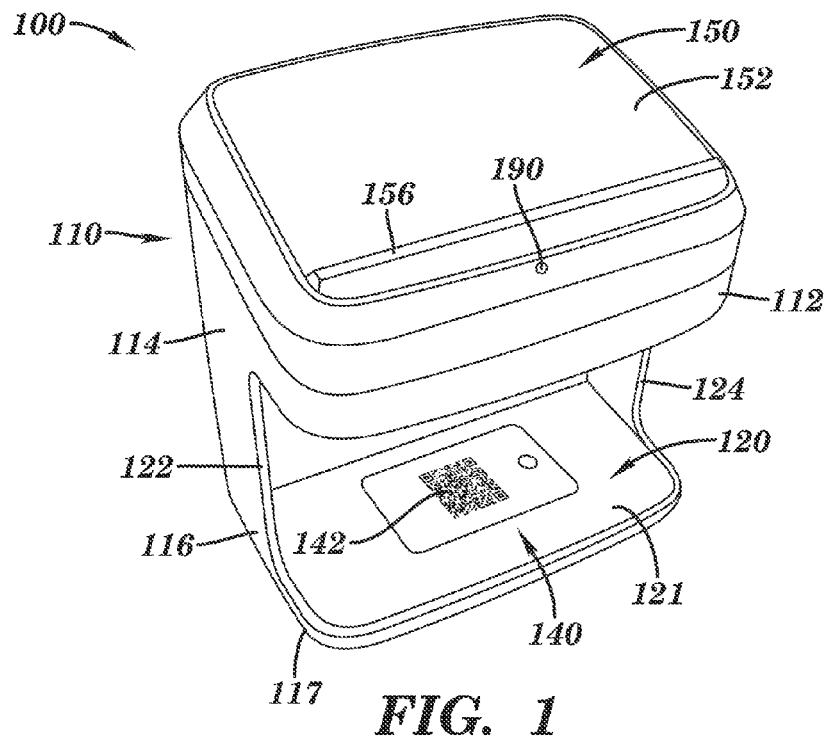
FIG. 1 is a perspective view of an embodiment of an imaging system in accordance with an aspects of the present disclosure.

FIG. 1 illustrates a first embodiment of an imaging system 100 for obtaining an image displayed on a display of a portable electronic device presented by a presenter such as a customer holding the electronic device in accordance with aspects of the present disclosure.

Figures 2, 3:
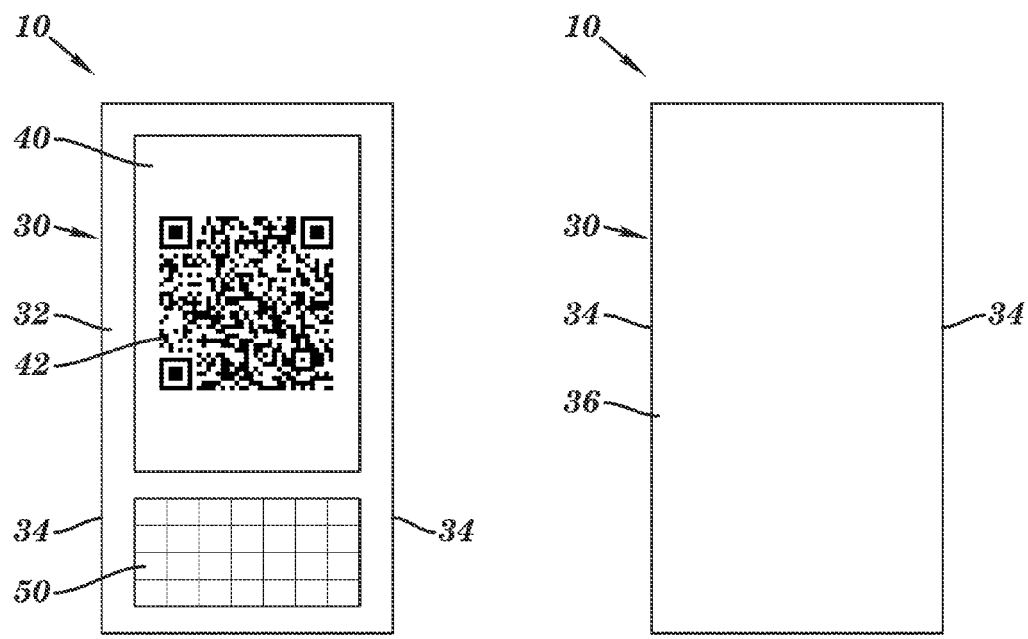
FIG. 2 is a front side elevational view of an embodiment of the portable electronic device usable with the imaging system of FIG. 1.
FIG. 3 is a rear side elevational view of the portable electronic device of FIG. 2.

As shown in FIGS. 2 and 3, a portable electronic device 10 may include a housing 30 having a front surface 32 (FIG. 2), side surfaces 34, and a rear surface 36 (FIG. 3). With reference to FIG. 2, portable electronic device 10 may further include a display screen 40 such as a backlit LED or LCD display for displaying an indicia 42. The display may also be an electronic paper display such as an e-paper display, electronic ink display, and other displays that mimic the appearance of ordinary ink on paper. Unlike conventional backlit flat panel displays, electronic paper displays reflect ambient light like ordinary paper rather than emitting its own light. A keyboard 50 enabling the input of data may also be disposed on front side 32 of housing 30. In another embodiment, the display may be a backlit LED or LCD touch screen display comprising a display and a touch sensitive overlay disposed over the display. In this manner, the display screen operates as a data input interface. Housing 30 may also support a variety of components, including a battery typically located in the rear half of the body.

Figure 9:
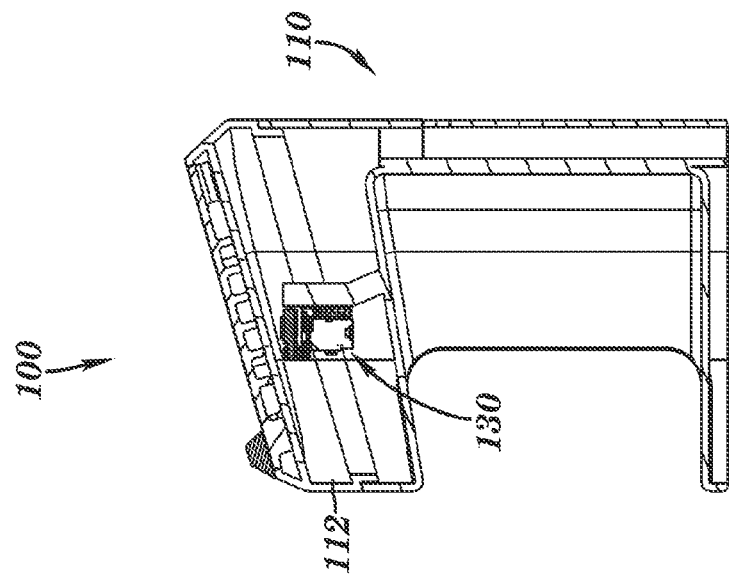
FIG. 9 is a cross-sectional view of the imaging system of FIG. 1.
Figure 8:
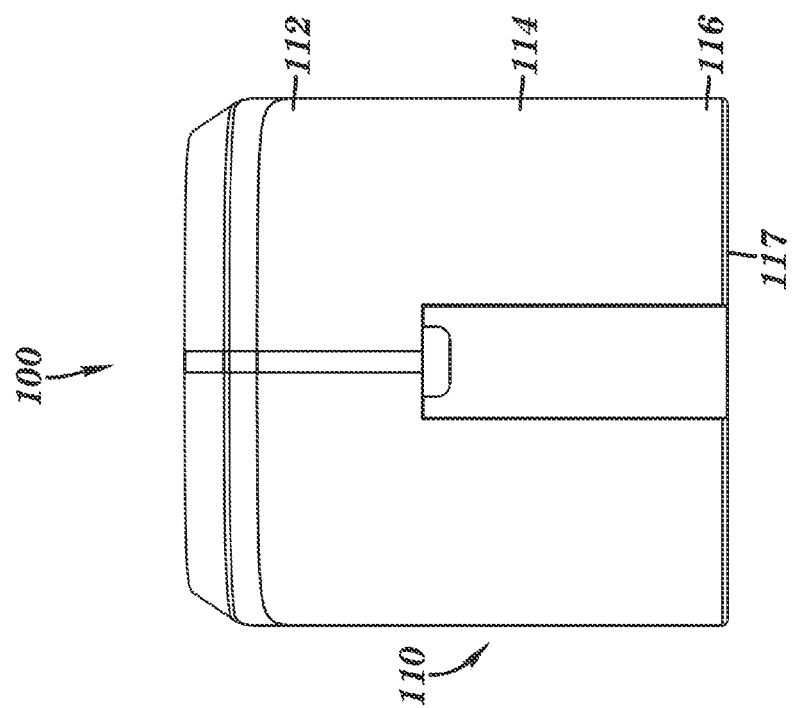

With reference to FIGS. 1 and 4-8, generally in this illustrated embodiment, imaging system 100 may include a housing 110 having an upper portion 112, a middle portion 114, and a lower portion 116. As shown in FIG. 1, housing 110 may have a generally C-shaped configuration in which the open C-shaped configuration is orientated toward a customer during the transaction. Lower portion 116 may define a lower surface 117 for resting on a counter such as at a checkout counter, and a pad or support 120 having an upper support surface 121 such as a horizontal support surface upon which a customer may place or rest and hold an electronic device against support surface 121 so that an image displayed on the display of the electronic device is positioned upwardly towards an imaging subsystem 130, best shown in FIG. 9, during imaging. For example, imaging subsystem 130 may be disposed in upper portion 112 of housing 110. Imaging subsystem 130 may be operable to focus an image of the display on the electronic device for imaging when the electronic device is rested on the support surface. For example, the imaging subsystem may have an imaging or optical axis that passes through the support surface and generally aligned with the center of the display of the electronic device to be imaged. Upper support surface 121 (FIG. 1) may be a rigid, fixed, and non-movable relative to imaging subsystem 130. For example, the upper support surface and the imaging subassembly may be fixed relative to the housing. Imaging subsystem 130 may have a fixed focus or focal length or a variable focus or focal length.

With reference again to FIG. 1, graphics or an outline 140 of a representation of electronic device and a bar code 142 may be disposed on support surface 121 for aiding a customer in orientating and locating the electronic device on the support surface during imaging. During imaging, a presenter may hold the sides of the electronic device with their fingers such as the index finger and thumb so that the display is disposed upwardly toward the imaging subsystem, and the electronic device and display screen may be observable to the presenter. Sidewalls 122 and 124 may be provided which extend along the sides to define a generally protected booth type or pocket area to shield the display of the electronic device from ambient light. Imaging system 100 may also include a customer facing camera 190 such as for imaging the customer or for facial recognition operable for example when during imaging an airline ticket on the electronic device and confirming that person corresponds to the presenter of the ticket, or imaging a customer's cart operable for determining whether any products remain in the cart prior to checkout, or for obtaining other images.

Upper portion 112 may include an electronic display 150 such as a backlit LED or LCD display for displaying advertisements or other information to the customer during a transaction. Display 150 may also include a surface 152 operable for allowing a customer to place and write out a check during the transaction. The display and/or surface may be disposed on an angle or slope towards the customer. A raised ridge or lip 156 may be provided along the lower edge of upper portion 112 to provide a stop for restraining, for example, a checkbook from sliding off surface 152. In another embodiment, the top of upper portion 112 may include a surface having a printed advertisement or other image or indicia. In another embodiment, the display may be a removable transparent member and a printed advertisement or an image may be sandwiched between a top portion of the housing and the transparent member.

Figure 10:
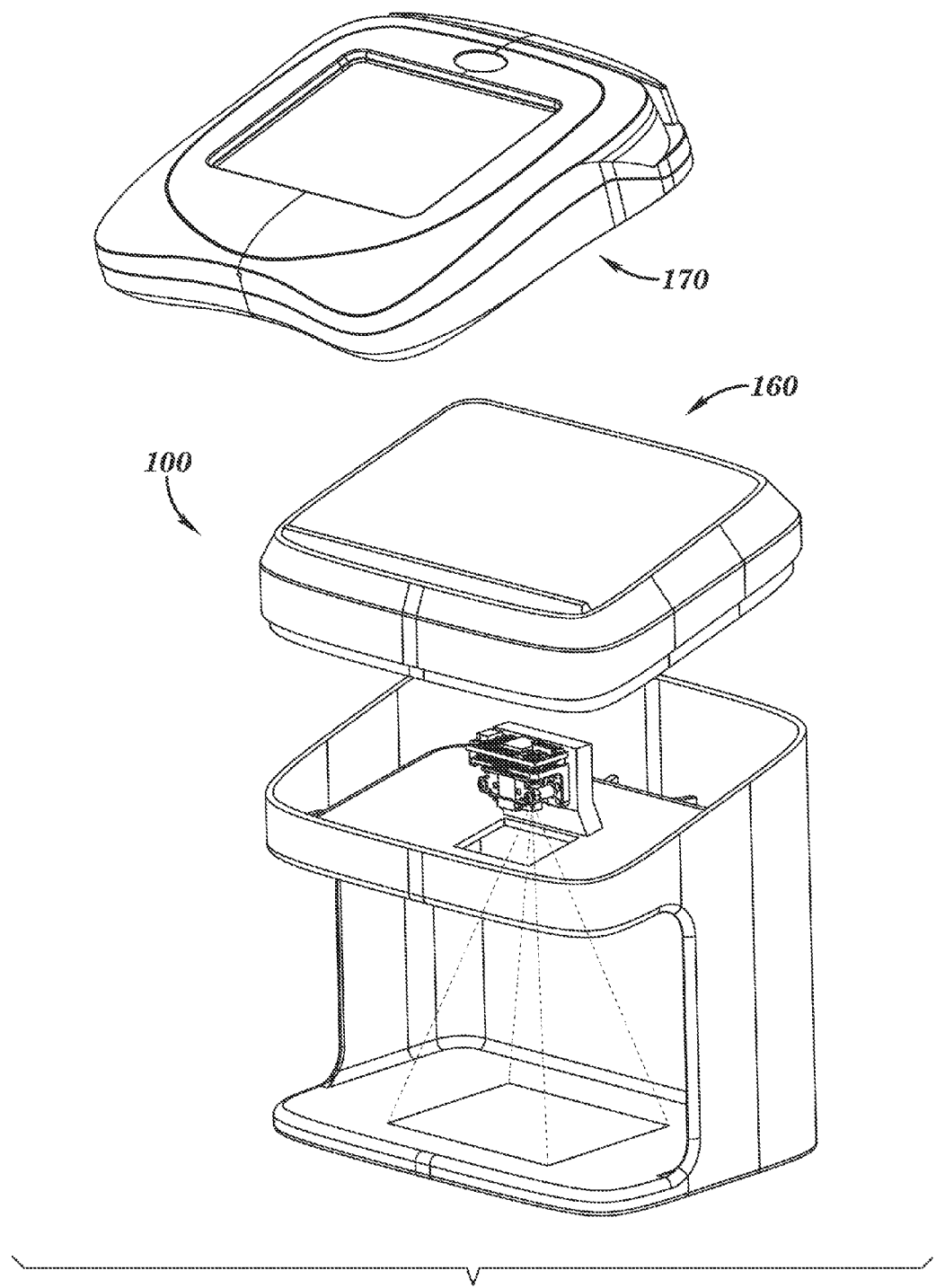
FIG. 10 is an exploded view of another embodiment of an imaging system in accordance with an aspects of the present disclosure.

With reference to FIG. 10, imaging system 100 may include a housing that is operably configured and releasably attachable to a display unit 160 and to a transaction terminal 170. For example, the transaction terminal may include magnetic strip readers to allow for use of credit cards, debit cards, and receipt of other information such as a customer's signature during the transaction.

Figure 11:
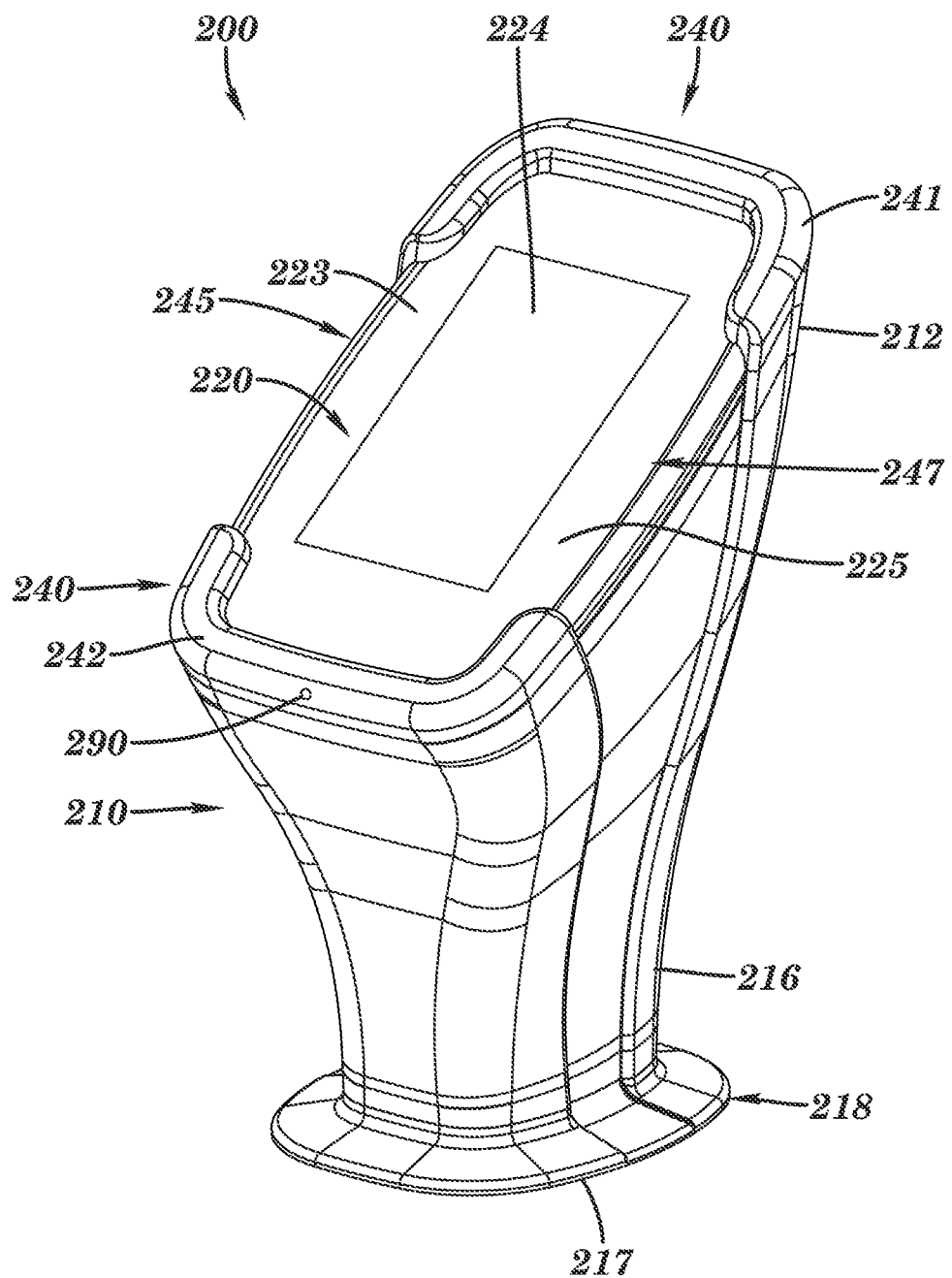
FIG. 11 is a perspective view of another embodiment of an imaging system in accordance with aspects of the present disclosure.

FIG. 11 illustrates a second embodiment of an imaging system 200 for obtaining an image displayed on a display of a portable electronic device presented by a presenter such as a customer holding the electronic device in accordance with aspects of the present disclosure. For example, a customer may place their cell phone face down on a support such as a glass support.

With reference to FIGS. 11-16, generally in this illustrated embodiment, imaging system 200 may include a housing 210 having an upper portion 212 and a lower portion 216. Lower portion 216 may operably connect to a base 218 having a lower surface 217 for resting imaging system 200 on a counter such as on a checkout counter.

Figure 17:
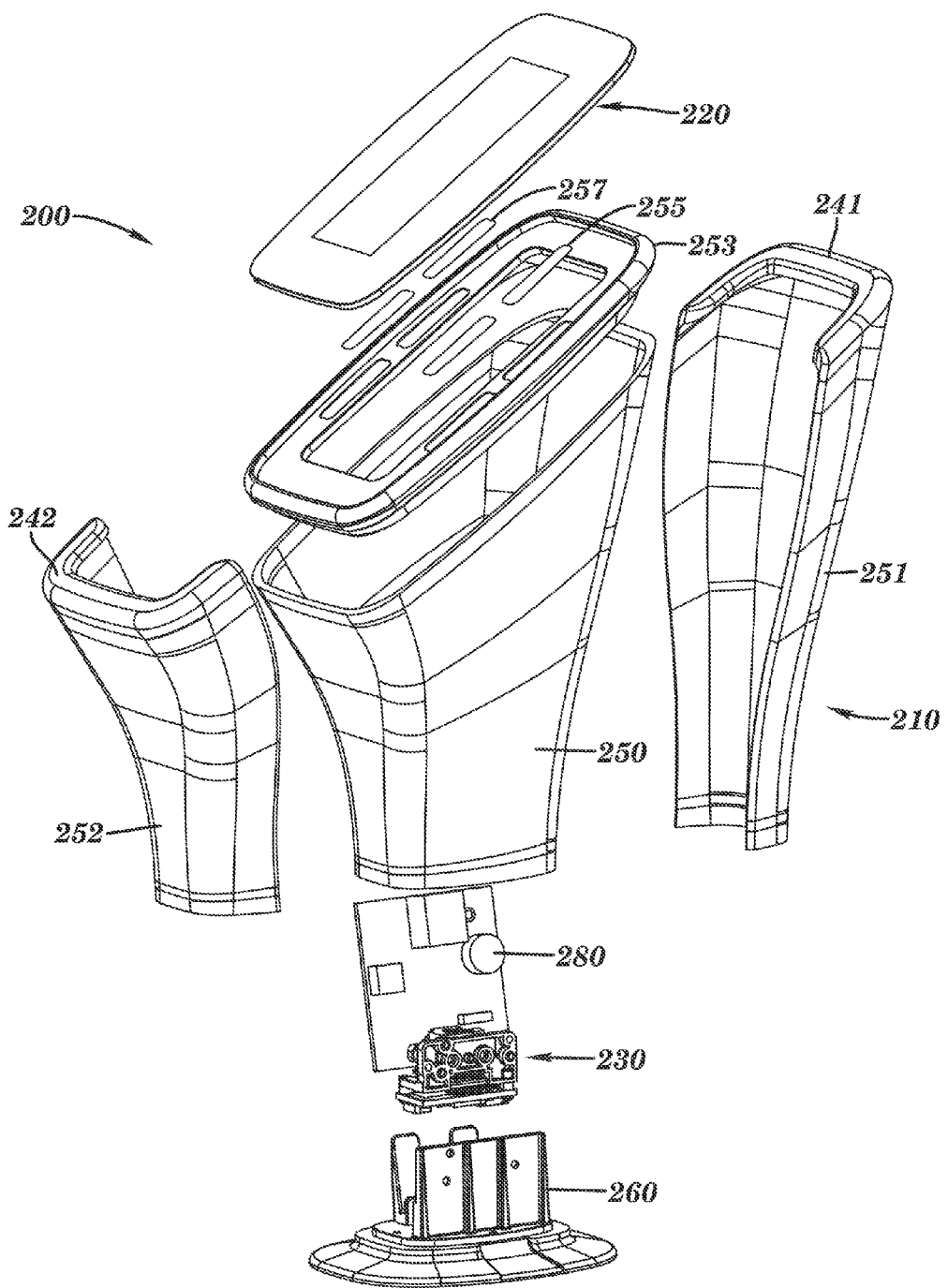
FIG. 17 is an exploded view of the imaging system of FIG. 11.

Upper portion 212 may include an angled support 220 having an upper support surface 223 which is disposed to face a customer and upon which the customer may place or rest and hold the side of the electronic device having the display containing the indicia against support surface 223 so that an image displayed on the display of the electronic device is positioned downwardly towards an imaging subsystem 230, best shown in FIG. 17, during imaging. For example, imaging subsystem 230 may be disposed behind a lower surface of support 220 in housing 210. The support may be angled at about 20 degrees to about 45 degrees, and may be disposed at 30 degrees, from the surface of the counter such as a checkout counter. For example, the imaging subsystem may have an imaging or optical axis that passes through the support surface and generally aligned with the center of the display of the electronic device to be imaged. The upper support surface of support 220 may be a rigid, fixed, and non-movable relative to imaging subsystem 230. For example, the upper support surface and the imaging subassembly may be fixed relative to the housing. Imaging subsystem 230 may have a fixed focus or focal length or a variable focus or focal length.

With reference again to FIG. 11, a bezel or raised ridge 240 may extend around support surface 220 for use in aiding the customer in locating the electronic device on support surface 220 during imaging. During imaging, the display of the electronic device is presented downwardly on the support surface. For example, the raised ridge may include a first portion 241 and second portion 242 defining a pair of gaps 245 and 247 disposed therebetween and along the edge of the support. The gaps are operable to allow a presenter to hold the sides of the electronic device with their fingers such as the index finger and thumb during imaging. The raised ridges may aid in preventing the electronic device from falling off the support surface and being damaged. In addition, the gaps allow the debris on the support surface to be easily wiped clean compared to the raised ridge extending completely around the support surface.

Support 220 may comprise a transparent portion 224 having a first upper surface portion and the imaging subsystem may be disposed behind a second lower surface portion of the transparent portion. Support 220 may include a non-transparent portion 225, for example, that surrounds transparent portion 224. The transparent portion may be sized smaller than the electronic device so that when the electronic device is placed and rested on support surface 223, the likelihood of ambient light reaching the imager subassembly is reduced. Imaging system 200 may also include a customer facing camera 290 such as for imaging the customer or for facial recognition operable for example when during imaging an airline ticket on the electronic device and confirming that person corresponds to the presenter of the ticket, or imaging a customer's cart operable for determining whether any products remain in the cart prior to checkout, or for obtaining other images.

With reference again to FIG. 17, imaging system 200 may include a central housing portion 250, a front U-shaped housing portion 252 having ridge 242, a rear U-shaped housing portion 251 having ridge 241, a hollow top cover 253, and a base 260. Imaging subsystem 230 may be disposed along the bottom of the housing with the imaging subsystem 230 facing upwardly. Imaging subsystem 230 may be operable to focus an image of the display on the electronic device for imaging when the electronic device is rested on the support surface.

In addition, the base or a plurality of bases attachable to the central housing portion may have different configurations and be interchangeable with the central housing portion, and allow various attachments to differently configured checkout environments. For example, a base may have screw holes for receiving screws which attach to a counter, a base may have a bar clamp for clamping onto a monitor stand or other equipment or portion thereof at the checkout counter, a base may have a U-shaped portion for fitting over and connecting to a top edge of a wall adjacent to the checkout lane. Desirably, the vertical configuration of the housing allows a small physical footprint and flexibility as to where it may be placed or mounted.

Electroluminescent paper 255 and 257 may be positioned between support 220 and top cover 253, and may be operably connected and energized to illuminate when an image has been successfully and unsuccessfully obtained and/or decoded. For example, the some of the electroluminescent paper or a colored layer disposed on the electroluminescent paper may be employed to provide a green illumination when an image has been successfully obtained and/or decoded, and other of the electroluminescent paper or a colored layer disposed on the electroluminescent paper may be employed to provide a red color when an image has been unsuccessfully obtained and/or decoded. It will be appreciated that other colors may be employed, and other means for providing illumination such as bulbs, LEDs, and other devices may be employed. In addition, an audio signal such as from a speaker 280 may be provided to indicate when an image has been successfully and unsuccessfully obtained and/or decoded. FIG. 18 illustrates imaging system 200 for facing a customer disposed on a checkout counter 12.

FIG. 19 illustrates a third embodiment of an imaging system 300 for obtaining an image displayed on a display of a portable electronic device presented by a presenter such as a customer holding the electronic device in accordance with aspects of the present disclosure. For example, a customer may place their cell phone face down on a support such as a glass support. The housing may have a low profile so that the imaging system is less likely to protruding into the customer's space, and be less likely to be inadvertently hit or snagged by the customer.

With reference to FIGS. 19-24, generally in this illustrated embodiment, imaging system 300 may include a housing 310 having an upper portion 312 and a lower portion 316. Lower portion 316 may include a lower surface 317 for resting imaging system 300 on a counter such as on a checkout counter.

Figure 25:
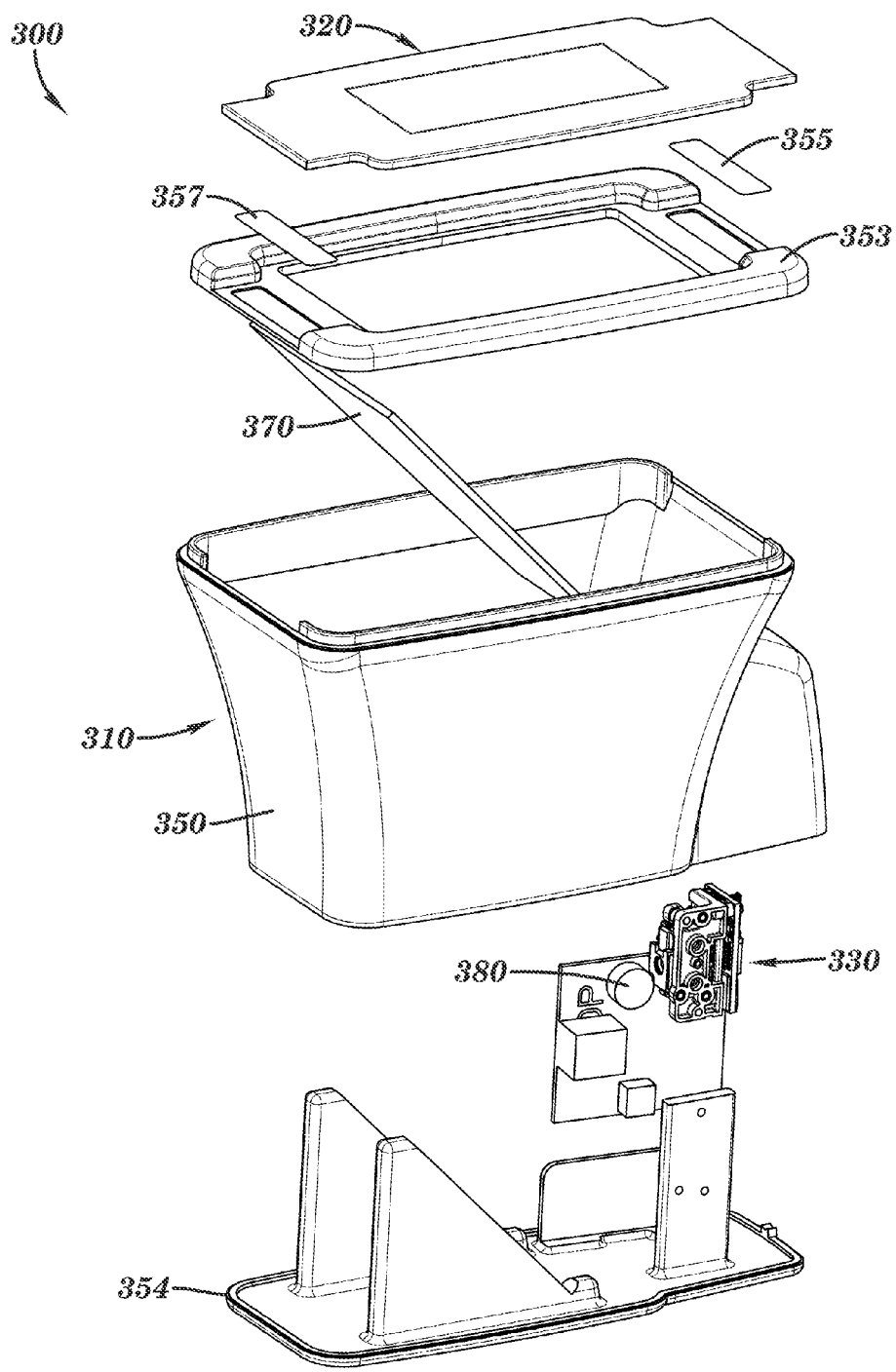
FIG. 25 is an exploded view of the imaging system of FIG. 19.

With reference to FIG. 19, upper portion 312 may include a horizontal support 320 having an upper support surface 323 upon which the customer may place or rest and hold the side of the electronic device having the display containing the indicia against support surface 323 so that an image displayed on the display of the electronic device is positioned downwardly towards an imaging subsystem 330, best shown in FIG. 25, during imaging. For example, imaging subsystem 330 may be disposed below a lower surface of the support surface of support 320 in housing 310. For example, the imaging subsystem may have an imaging or optical axis that passes through the support surface and generally aligned with the center of the display of the electronic device to be imaged. The upper support surface of support 320 may be a rigid, fixed, and non-movable relative to imaging subsystem 330. For example, the upper support surface and the imaging subassembly may be fixed relative to the housing. Imaging subsystem 330 may have a fixed focus or focal length or a variable focus or focal length.

With reference again to FIG. 19, a bezel or raised ridge 340 may extend around support surface 320 for use in aiding a customer in locating the electronic device on support surface 320 during imaging. During imaging, the display of the electronic device is presented downwardly on the support surface. For example, the raised ridge may include a first portion 341 and second portion 342 defining a pair of gaps 345 and 347 disposed therebetween and along the edge of the support. The gaps are operable to allow a presenter to hold the sides of the electronic device with their fingers such as the index finger and thumb during imaging. The raised ridges may aid in preventing the electronic device from falling off the support surface and being damaged. In addition, the gaps allow the debris on the support surface to be easily wiped clean compared to the raised ridge extending completely around the support surface.

Support 320 may comprise a transparent portion 324 having a first upper surface portion and the imaging subsystem may be disposed behind a second lower surface portion of the transparent portion. Support 320 may include a non-transparent portion 325, for example, that surrounds transparent portion 324. The transparent portion may be sized smaller than the electronic device so that when the electronic device is placed and rested on support surface 323, the likelihood of ambient light reaching the imager subassembly is reduced. Imaging system 300 may also include a customer facing camera 390 such as for imaging the customer or for facial recognition operable for example when during imaging an airline ticket on the electronic device and confirming that person corresponds to the presenter of the ticket, or imaging a customer's cart operable for determining whether any products remain in the cart prior to checkout, or for obtaining other images.

With reference to FIG. 25, imaging system 300 may include a central housing portion 350, a mirror 370 disposed on an angle in housing portion 350, a hollow top cover 353, a bottom cover 354, and support 320. Imaging subsystem 330 may be disposed in the housing with the imaging subsystem 330 facing to the side such as toward mirror 370. For example, mirror 370 may reflect the image presented on support 320 towards imaging subsystem 330. Imaging subsystem 330 may be operable to focus an image of the display on the electronic device for imaging when the electronic device is rested on the support surface.

Electroluminescent paper 355 and 357 may be positioned between support 320 and top cover 353, and may be operably connected and energized to illuminate when an image has been successfully and unsuccessfully obtained and/or decoded. For example, electroluminescent paper 355 or a colored layer disposed on electroluminescent paper 355 may be employed to provide a green illumination when an image has been successfully obtained and/or decoded, and electroluminescent paper 357 or a colored layer disposed on the electroluminescent paper 357 may be employed to provide a red color when an image has been unsuccessfully obtained and/or decoded. It will be appreciated that other colors may be employed, and other means for providing illumination such as bulbs, LEDs, and other devices may be employed. In addition, an audio signal such as from a speaker 380 may be provided to indicate when an image has been successfully and unsuccessfully obtained and/or decoded.

Figure 26:
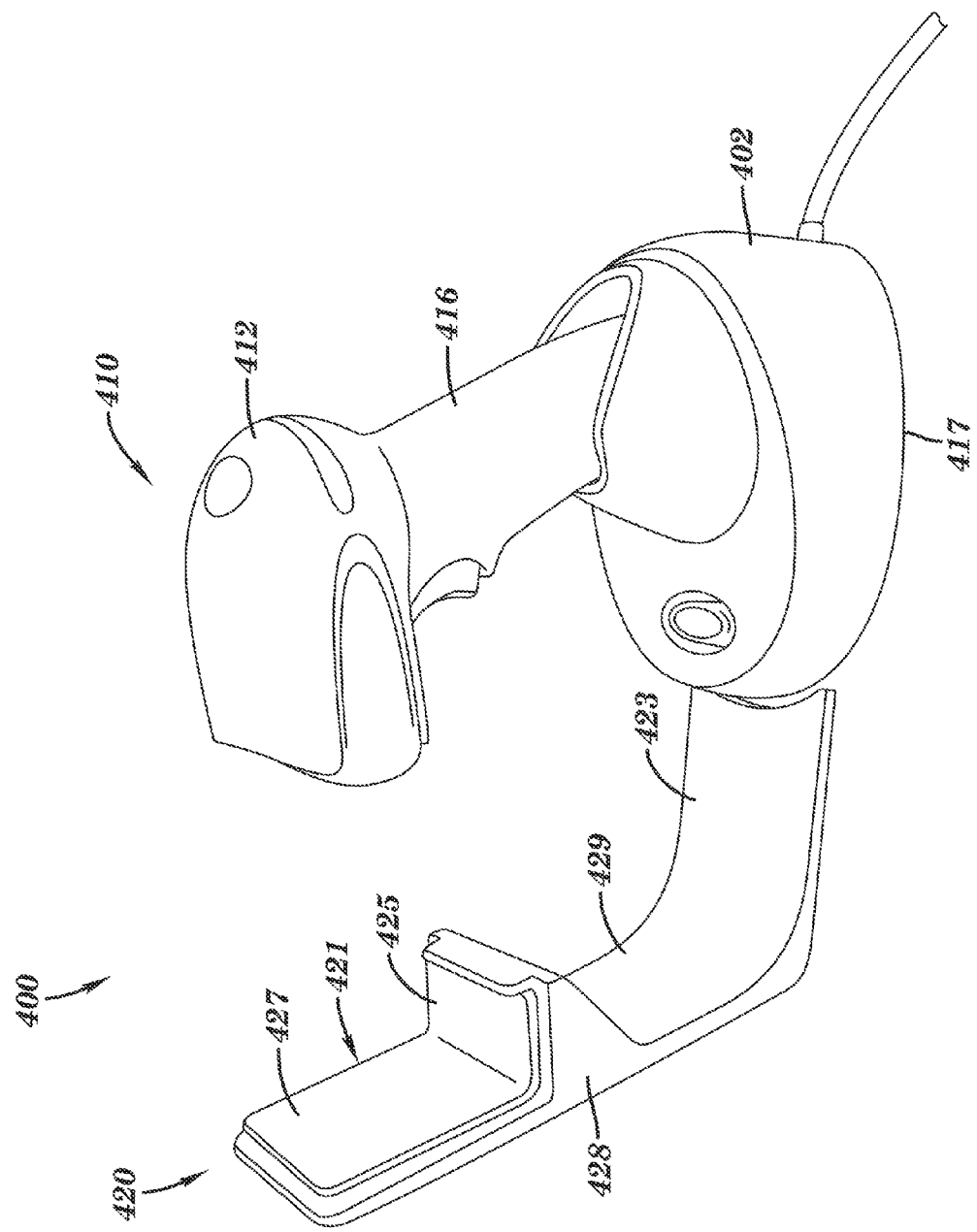
FIG. 26 is a perspective view of another embodiment of an imaging system in accordance with aspects of the present disclosure.
Figure 29:
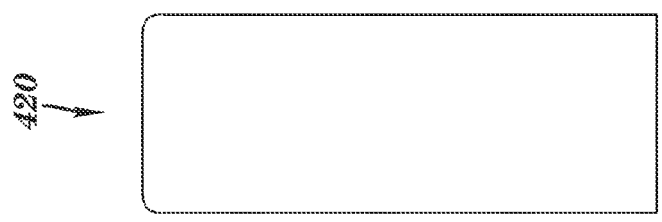
FIG. 29 is a rear elevational view of the imaging system of FIG. 26.
Figure 28:
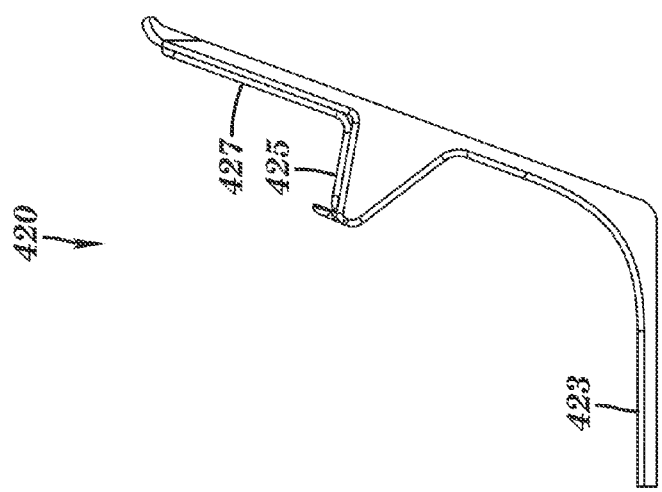
FIG. 28 is a right side elevational view of the imaging system of FIG. 26, a left side elevation view being a mirror image thereof.
Figure 27:
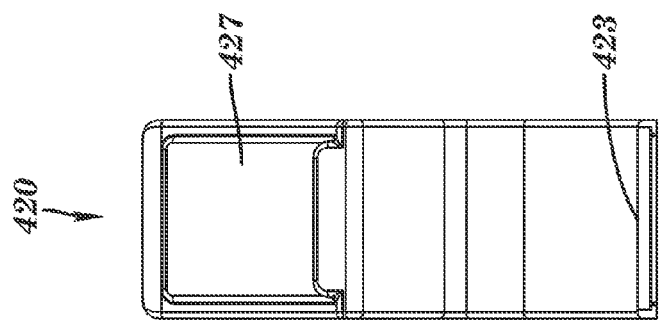
FIG. 27 is a front elevational view of the imaging system of FIG. 26.

With reference to FIGS. 26-29, generally in this illustrated embodiment, an imaging system 400 (FIG. 26) may include a housing 410 having an imaging subsystem such as described below. Housing 410 may include an upper portion 412, and a lower portion 416. As shown in FIG. 26, housing 410 may have a handheld configuration or form in which lower portion 416 is receivable in a charger or base 402. Base 402 may include a lower surface 417 for resting on a counter such as at a checkout counter. A stand or support 420 may be postionable adjacent to housing 410.

As shown in FIG. 26, support 420 may include a base portion 423, a support surface 421 such as a first support surface 425 and a second support surface 427 upon which a customer may place or rest and hold an electronic device against support surface 421 so that an image displayed on the display of the electronic device is positioned outwardly toward housing 410 during imaging. For example, an operator of imaging system 400 may stand behind housing 410 and readily grasp and actuate housing 410 such as a trigger during a transaction. A customer may stand on the right side, behind support 420 and easily place and rest an electronic device such as the bottom on support surface 425 and the back against support surface 427, with the display facing toward housing 410. Support 420 may be sized, for example, side edges 428 and 429, to be narrower than the electronic device to allow a presenter to hold the sides of the electronic device with their fingers during imaging. In addition, the presenter may hold the electronic device between their fingers and thumb and slide their hand over the top of support surface 427 so that support surface 427 is disposed between the electronic device and the palm of the presenter. For example, the imaging subsystem may have an imaging or optical axis that passes through the second support surface and generally aligned with the center of the display of the electronic device to be imaged. First support surface 425 and a second support surface 427 may be a rigid, fixed, and non-movable relative to housing 410 and an imaging subsystem disposed therein. For example, the support surfaces may be fixed relative to the base and the housing containing the imaging subassembly. The imaging subsystem may have a fixed focus or focal length or a variable focus or focal length.

Figure 30:
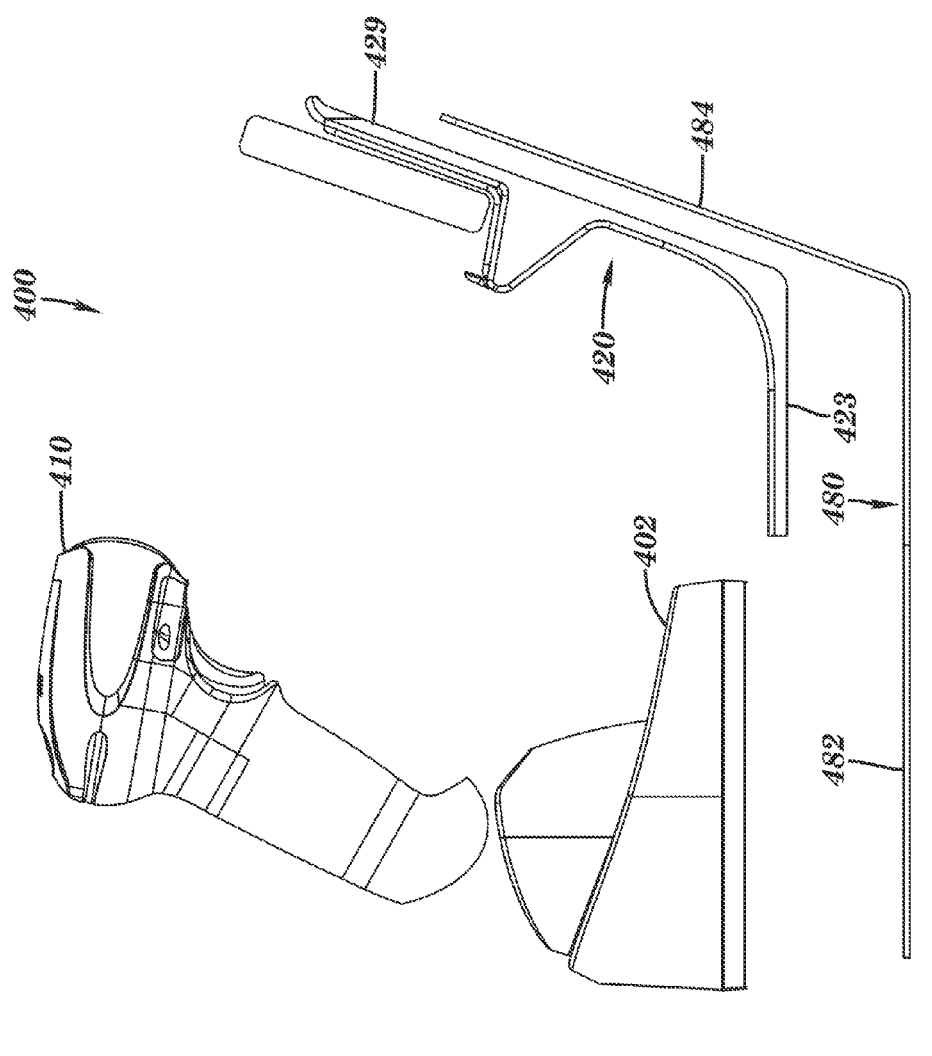
FIG. 30 is an exploded view of the imaging system of FIG. 26.

With reference to FIG. 30, imaging system 400 may include a bracket 480 having a first leg 482 attachable to a surface such as a counter surface, and a second upwardly extending leg 484. Rear surface 429 of support 420 may be attached leg 484, and base proportion 423 of support 420 may be attached to a portion of leg 482.

Figure 31:
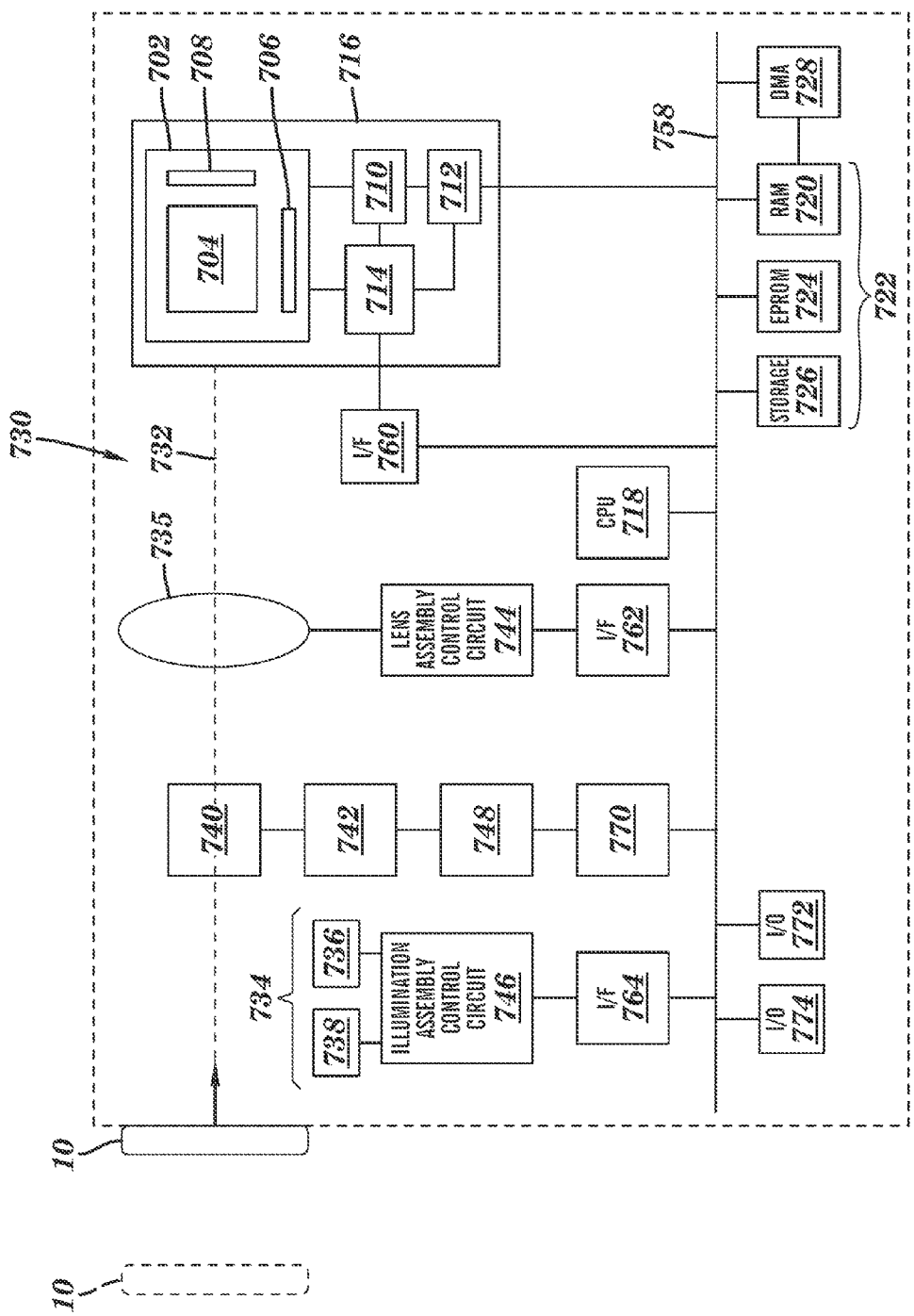
FIG. 31 is a component diagram of an imager subassembly which may be incorporated in the above embodiments of the imaging systems in accordance with aspects of the present disclosure.

FIG. 31 illustrates a component diagram of an imaging subsystem 730 that may be employed as the imaging subsystems in the above described imaging systems for imaging a display of electronic device 10 disposed against a support surface shown in solid lines or a rear surface of electronic device 10 disposed against a support surface shown in dashed lines.

The imaging subsystem 730 may include an image sensor 702 comprising a multiple pixel image sensor array 704, for example, an optical such as a CCD image sensor or a CMOS image sensor having pixels arranged in rows and columns of pixels, column circuitry 706, and row circuitry 708. Associated with the image sensor 702 may be amplifier circuitry 710, and an A/D converter 712 which may convert image information in the form of analog signals read out of multiple pixel image sensor array 704 into image information in the form of digital signals. Image sensor 702 may also have an associated timing and control circuit 714 for use in controlling, e.g., the exposure period of image sensor 702, and/or gain applied to amplifier 710. The noted circuit components 702, 710, 712, and 714 may be packaged into a common image sensor integrated circuit 716. In one embodiment, image sensor integrated circuit 716 may incorporate a Bayer pattern filter. CPU 718, prior to subjecting a frame to further processing, may interpolate pixel values for development of a monochrome frame of image data.

In the course of operation of the imaging subassembly 730, image signals may be read out of image sensor array 702, converted and stored into a system memory such as RAM 720. A memory 722 of imaging subassembly 730 may include RAM 720, a nonvolatile memory such as EPROM 724, and a storage memory device 726 such as may be provided by a flash memory or a hard drive memory.

In one embodiment, imaging subassembly 730 may include CPU 718 adapted to read out image data stored in memory 722 and subject such image data to various image processing algorithms, such as processing for attempting to decode decodable indicias represented in the image data. In another embodiment, CPU 718 may be operatively connected to the image sensor array 704 for capturing the return light in successive frames, and subject one or more of such frames of image data to various image processing algorithms, such as processing for attempting to decode decodable indicias represented in the image data. Alternatively, for example, at a checkout, the image data may be sent to an operating system of the retail environment, and feedback generated with audio or visual indicators as noted above.

Imaging subassembly 730 may include a direct memory access unit (DMA) 728 for routing image information read out from image sensor 702 that has been subject to conversion to RAM 720. In another embodiment, imaging subassembly 730 may employ a system bus providing for bus arbitration mechanism (e.g., a PCI bus) thus eliminating the need for a central DMA controller. Other embodiments of the system bus architecture and/or direct memory access components providing for efficient data transfer between the image sensor 702 and RAM 720 are within the scope of this disclosure.

In a further aspect, the imaging subassembly 730 may include an imaging assembly 735 for focusing an image of the decodable indicia onto image sensor 702. Imaging light rays may be transmitted about an optical axis 732. Imaging assembly 735 may be controlled with use of lens assembly control circuit 744. Lens assembly control circuit 744 may send signals to lens assembly 735, e.g., for changing a focal length and/or a best focus distance of lens assembly 735. In an alternative embodiment, imaging subassembly may have a fixed focal length operable to focus an image of the display on the electronic device onto image sensor array 704 when the electronic device is rested on the support surface.

The imaging subassembly 730 may further include a filter module 740 that comprises one or more optical filters, as well as in some embodiments an actuator assembly 742 that may be coupled generally to the filter module, such as to the optical filters. The filter module 740 may be located on either side of the imaging lens assembly 735. Likewise, one or more of the optical filters within the filter module 740 may be disposed on one or more surfaces of the imaging assembly 735 and/or the image sensor 702. Filter module 740 may be controlled with use of a filter module control circuit 748, which may be coupled to the actuator assembly 742.

Imaging subassembly 730 may include interface circuit 760 for coupling image sensor timing and control circuit timing and control circuit 714 to system bus 758, interface circuit 762 for coupling the lens assembly control circuit 744 to system bus 758, and interface circuit 770 for coupling the filter module control circuit 748 to system bus 758.

In a further aspect, imaging subassembly 730 may include one or more I/O interfaces 772 and 774 for providing communication with external devices (e.g., a cash register server, a store server, an inventory facility server, a local area network base station, a cellular base station). I/O interfaces 772 and 774 may be interfaces of any combination of known computer interfaces, e.g., Ethernet (IEEE 802.3), USB, IEEE 802.11, Bluetooth, CDMA, and GSM.

The imaging subsystem 730 may include an illumination assembly 734 that may comprise an illumination light bar 736 for generating an illumination pattern substantially corresponding to the field of view of the imaging subassembly, and an indicator light bar 738. The illumination assembly 734 may be controlled by an illumination assembly control circuit 746. An interface circuit 764 may be employed for coupling the illumination assembly to system bus 758, and operably connected to CPU 718. While illumination may not be needed for imaging the display such as a back lit display on an electronic device, for obtaining other images such as paper coupons, driver's licenses, store or loyalty cards, and other documents or an electronic paper display, illumination may be desired.

FIG. 32 illustrates a method 800 for use in obtaining images in accordance with aspects of the present disclosure. At 810, a support comprising a support surface is provided which is operable for allowing a presenter to hold an electronic device against the support surface so that a display on the electronic device is positioned towards an imager. At 820, when the electronic device is positioned on the support and held by the presenter, an image is obtained of the display of the electronic device with the imager.

From the present description, it will be appreciated that the imaging systems provide an ergonomically and aesthetically pleasing option for convenient reading of, for example, cell phone bar codes in the retail environment by making a user's experience generally intuitive, easy and quick. In addition, the customer is able to hold the electronic device such as a cell phone during imaging, reducing the likelihood of the customer having to hand it to a cashier or potentially forgetting and losing the cell phone. Additional features of the imaging system may include the imaging system being operable as a finger print reader which may provide authorization of the transaction or conformation of the customer. While the imaging systems are disclosed as being supportable on a counter such as a checkout counter, it will be appreciated that they may be operably supported, attached, clamped, to another portion of the counter or support or clamped onto an elongated member, pole, or other device. In addition, the imaging systems may incorporate NFC (Near Field Communication) capabilities to establish radio communication with an electronic device having such capability for transmitting and receiving information. Other additional features may include incorporating the imaging system into a self check out kiosk, with may include a printer, magnetic stripe reader, NFC capability, and a radio. A customer who is redeeming a cell phone coupon or using a credit card for a quick purchase could avoid waiting in lines. In addition, customers wanting a printed hard copy receipt may obtain one by holding their phone near the NFC/barcode reader and the kiosk would print the receipt.

A small sample of systems methods and apparatus that are described herein is as follows:

A1. A method for obtaining images, the method comprising: providing a support comprising a support surface operable for allowing a presenter to hold an electronic device against the support surface so that a display on the electronic device is positioned towards an imaging system; and obtaining, while the electronic device is positioned against the support and held by the presenter, an image of the display of the electronic device with the imager. A2. The method of A1 wherein the providing comprises providing the support attached to a checkout counter, and the presenter comprises a customer in a transaction. A3. The method of A1 wherein the providing comprises providing the support surface operable for allowing the presenter to hold a side of the electronic device opposite the display against the support surface. A4. The method of A1 further comprising providing an outline of a representation of an electronic device on the support surface for aiding the presenter in positioning of the electronic device. A5. The method of A1 further comprising displaying information to the presenter during imaging of the display of the electronic device. A6. The method of A1 wherein the providing comprises providing a generally C-shaped housing with the support defining a horizontal pad and the imager being disposed in the housing above the horizontal pad. A7. The method of A1 wherein the support surface comprises a transparent portion, the display on the electronic device being positioned against a first surface of the transparent portion, and the imaging subsystem being disposed behind a second surface of the transparent portion. A8. The method of A7 wherein the support surface comprises an angled surface facing the presenter. A9. The method of A7 further comprising providing at least one raised ridge extending around the support surface for use in positioning the electronic device on the support surface. A10. The method of A9 wherein the at least one raised ridge comprises a first portion and a second portion defining a pair of gaps disposed therebetween, the gaps operable to allow a presenter to maintain a hold of the sides of the electronic device with their fingers during imaging. A11. The method of A7 wherein the support surface comprises a non-transparent portion disposed around the transparent portion to reduce the likelihood of ambient light reaching the imager when the electronic device is positioned on the support surface during imaging. A12. The method of A1 wherein the providing comprises providing the support surface comprising a first surface for resting a bottom edge of the electronic device during imaging. A13. The method of A12 wherein the support surface comprises a second surface for resting a surface opposite the display on the electronic device. A14. The method of A1 further comprising indicating to the presenter at least one of an image being successfully obtained, an image being unsuccessfully obtained, a successful decoding of the image, and an unsuccessful decoding of the image. A15. The method of A1 further comprising obtaining an image of at least a portion of the presenter. A16. The method of A1 further comprising obtaining, while an object is positioned against the support and held by the presenter, an image of the object with the imager. A17. The method of A17 wherein the object comprises at least one of a paper coupon, a driver's licenses, an identification card, a store card, and a loyalty card.

B1. An imaging system for obtaining an image of a display of an electronic device presented by a presenter holding the electronic device during a transaction, said imaging system comprising: a housing; an imaging subsystem disposed in the housing, said imaging subsystem comprising an image sensor array and an imaging assembly operative for focusing an image of the display on the electronic device onto said image sensor array; and a support comprising a support surface operable for allowing the presenter to hold the electronic device against the support surface so that the display on the electronic device is positioned towards the imaging system while the image of the display is obtained. B2. The system of B1 wherein said support surface is operable to allow the presenter to rest the electronic device so that the display of the electronic device is observable by the presenter during imaging. B3. The system of B1 wherein said support surface has an outline of a representation of an electronic device for aiding the presenter in locating the electronic device on the support surface during imaging. B4. The system of B1 further comprising a display attachable to said housing, said display facing the presenter for displaying information to the presenter during imaging of the electronic device. B5. The system of B1 further comprising a transaction terminal attachable to said housing, said transaction terminal facing the presenter for use in processing a transaction. B6. The system of B1 further comprising at least one of a display unit and a transaction terminal releasably attachable to said housing. B7. The system of B1 wherein said housing and said support surface define a generally C-shaped configuration with said support surface defining a horizontal pad and said imaging subsystem being disposed in said housing above said horizontal pad. B8. The system of B1 wherein the support surface comprises an angled surface facing the presenter. B9. The system of B1 wherein said support surface comprises a transparent portion on which the presenter places the display of the electronic device against a first surface of said transparent portion, and said imaging subsystem being disposed behind a second surface of said transparent portion. B10. The system of B9 further comprising at least one raised ridge extending around said support surface for use in aiding the presenter in locating the electronic device on said support surface. B11. The system of B9 wherein said at least one raised ridge comprises a first portion and second portion defining a pair of gaps disposed therebetween, said gaps operable to allow the presenter to hold the sides of the electronic device with their fingers during imaging. B12. The system of B10 wherein said support surface comprises a non-transparent portion disposed around said transparent portion to reduce the likelihood of ambient light reaching the imager when the electronic device is positioned on the support surface during imaging. B13. The system of B1 wherein said support surface comprises a first surface for allowing the presenter to rest a bottom edge of the electronic device while holding the side edges of the electronic device. B14. The system of B13 wherein said support surface comprises a second surface for allowing the presenter to rest the back surface of the electronic device while holding the side edges of the electronic device with their fingers. B15. The system of B1 further comprising means for at least one of indicating to the presenter that the image was successfully obtained, the image was unsuccessfully obtained, the image was successful decoded, and the image was unsuccessful decoded. B16. The system of B1 further comprising a camera operable to image at least a portion of the presenter. B17. The system of B1 wherein housing comprises means for attaching the system to a checkout counter.

While the present invention has been described with reference to a number of specific embodiments, it will be understood that the true spirit and scope of the invention should be determined with respect to claims that may be supported by the present specification. Further, while in numerous cases herein wherein systems and apparatuses and methods are described as having a certain number of elements it will be understood that such systems, apparatuses and methods may be practiced with fewer than the mentioned certain number of elements. Also, while a number of particular embodiments have been described, it will be understood that features and aspects that have been described with reference to each particular embodiment may be used with each remaining particularly described embodiment.

The invention claimed is:
1. An imaging system, comprising:
a housing comprising a support surface and a raised ridge disposed around the support surface defining a gap, the housing and the support surface defining a generally C-shaped configuration;
an image sensor within the housing; and
an imaging assembly within the housing configured for focusing an image of an electronic device's display onto the image sensor;
wherein the support surface is configured for supporting an electronic device while the imaging system captures an image of the electronic device's display with the image sensor and imaging assembly.

2. The imaging system of claim 1, wherein the support surface comprises a transparent portion having a first surface opposite a second surface, the image sensor and the imaging assembly being disposed behind the second surface.

3. The imaging system of claim 2, wherein the support surface comprises a non-transparent portion surrounding a portion of the transparent portion.

4. The imaging system of claim 1, comprising an electronic display for displaying information to a presenter of an electronic device while the imaging system captures an image of the electronic device's display.

5. The imaging system of claim 1, wherein the support surface comprises an angled support surface.

6. The imaging system of claim 1, wherein the support surface comprises:
 a first support surface for supporting an edge of an electronic device; and
 a second support surface for supporting an electronic device's back surface opposite the electronic device's display.

7. The imaging system of claim 1, comprising a camera configured to capture images of a portion of a presenter of an electronic device.

8. An imaging system, comprising:
 a housing comprising an angled support surface and a raised ridge disposed around the angled support surface defining a gap;
 an image sensor within the housing; and
 an imaging assembly within the housing configured for focusing an image of an electronic device's display onto the image sensor;
 wherein the angled support surface is configured for supporting an electronic device while the imaging system captures an image of the electronic device's display with the image sensor and imaging assembly; and
 wherein the support surface comprises a transparent portion having a first surface opposite a second surface, the image sensor and the imaging assembly being disposed behind the second surface.

9. The imaging system of claim 8, wherein the housing defines a generally C-shaped configuration.

10. The imaging system of claim 8, wherein the gap is configured to permit a presenter of an electronic device to hold sides of the electronic device with a finger in the gap.

11. The imaging system of claim 8, wherein the angled support surface is configured to permit a presenter of an electronic device to hold a side of the electronic device opposite the electronic device's display against the angled support surface.

12. The imaging system of claim 8, wherein the angled support surface comprises:
 a first support surface for supporting an edge of an electronic device; and
 a second support surface for supporting an electronic device's back surface opposite the electronic device's display.

13. The imaging system of claim 8, wherein the angled support surface comprises a non-transparent portion surrounding a portion of the transparent portion.

14. An imaging system, comprising:
 an image sensor;
 an imaging assembly configured for focusing an image of an electronic device's display onto the image sensor;
 a support surface configured for supporting an electronic device while the imaging system captures an image of the electronic device's display with the image sensor and imaging assembly, the support surface comprising a transparent portion having a first surface opposite a second surface, the image sensor and the imaging assembly being disposed behind the second surface; and
 a raised ridge disposed around the support surface defining a gap.

15. The imaging system of claim 14, comprising an electronic display for displaying information to a presenter of an electronic device while the imaging system captures an image of the electronic device's display.

16. The imaging system of claim 14, comprising a transaction terminal communicatively connected to the image sensor for processing a transaction.

17. The imaging system of claim 14, wherein the gap is configured to permit a presenter of an electronic device to hold sides of the electronic device with a finger in the gap.

18. The imaging system of claim 14, wherein the support surface comprises:
 a first support surface for supporting an edge of an electronic device; and
 a second support surface for supporting an electronic device's back surface opposite the electronic device's display.

19. The imaging system of claim 14, comprising a camera configured to capture images of a portion of a presenter of an electronic device.

20. The imaging system of claim 14, wherein the support surface comprises a non-transparent portion surrounding a portion of the transparent portion.

* * * * *